(12) United States Patent
Chae et al.

(10) Patent No.: US 11,726,821 B2
(45) Date of Patent: Aug. 15, 2023

(54) ELECTRONIC APPARATUS AND CONTROL METHOD THEREOF

(71) Applicant: SAMSUNG ELECTRONICS CO., LTD., Suwon-si (KR)

(72) Inventors: Changhyeon Chae, Suwon-si (KR); Jusun Song, Suwon-si (KR); Jaehoon Jeong, Suwon-si (KR); Jihun Jung, Suwon-si (KR); Jaeook Kwon, Suwon-si (KR); Seokjae Jeong, Suwon-si (KR); Youngho Choi, Suwon-si (KR); Cheulhee Hahm, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/751,860

(22) Filed: May 24, 2022

(65) Prior Publication Data
US 2022/0283865 A1 Sep. 8, 2022

Related U.S. Application Data

(63) Continuation of application No. 16/998,284, filed on Aug. 20, 2020, now Pat. No. 11,385,932.

(30) Foreign Application Priority Data

Aug. 22, 2019 (KR) .......................... 10-2019-0102743

(51) Int. Cl.
*G06F 9/46* (2006.01)
*G06F 9/50* (2006.01)
*G06F 9/48* (2006.01)

(52) U.S. Cl.
CPC ............ *G06F 9/5016* (2013.01); *G06F 9/485* (2013.01)

(58) Field of Classification Search
CPC ............................... G06F 9/5016; G06F 9/485
See application file for complete search history.

(56) References Cited

U.S. PATENT DOCUMENTS

| 8,595,349 B1 | 11/2013 | Wong et al. |
| 9,965,188 B2 | 5/2018 | Qiao et al. |
| (Continued) | | |

FOREIGN PATENT DOCUMENTS

| JP | 2003-316585 | 11/2003 |
| KR | 10-2008-0052339 | 6/2008 |
| (Continued) | | |

OTHER PUBLICATIONS

Extended European Search Report dated May 18, 2022 for EP Application No. 20855752.0.
U.S. Appl. No. 16/998,284, filed Aug. 20, 2020; Chae et al.

*Primary Examiner* — Gregory A Kessler
(74) *Attorney, Agent, or Firm* — Nixon & Vanderhye P.C.

(57) ABSTRACT

An electronic apparatus includes: a memory; a storage; and a processor, wherein: the electronic apparatus is configured to execute a plurality of processes as data of the plurality of processes is loaded into the memory based on execution of at least one program stored in the storage, the processor is configured to: identify a function currently running among a plurality of functions providable by the electronic apparatus, and based on a relationship between the plurality of processes and the identified function, terminate at least one process among the plurality of running processes, and allow a storage area of the memory loaded with the data of the terminated process to be available for another process.

19 Claims, 13 Drawing Sheets

(56) References Cited

U.S. PATENT DOCUMENTS

| | | |
|---|---|---|
| 10,101,910 B1 | 10/2018 | Karppanen |
| 2004/0181782 A1 | 9/2004 | Findeisen |
| 2008/0140960 A1 | 6/2008 | Basler et al. |
| 2014/0208328 A1 | 7/2014 | Chen |
| 2015/0256476 A1 | 9/2015 | Kurtzman et al. |
| 2015/0331612 A1 | 11/2015 | Qiao et al. |
| 2016/0004574 A1 | 1/2016 | Liu et al. |
| 2016/0274954 A1 | 9/2016 | Ishii |
| 2016/0378556 A1 | 12/2016 | Luo et al. |
| 2017/0357465 A1 | 12/2017 | Dzeryn et al. |

FOREIGN PATENT DOCUMENTS

| | | |
|---|---|---|
| KR | 10-0900439 | 6/2009 |
| KR | 10-2019-0011670 | 2/2019 |

| PROCESS | Restart Control |
|---|---|
| FIRST PROCESS | 00000000 |
| SECOND PROCESS | 00000111 |
| THIRD PROCESS | 00000000 |
| FOURTH PROCESS | null |
| . . . | . . . |

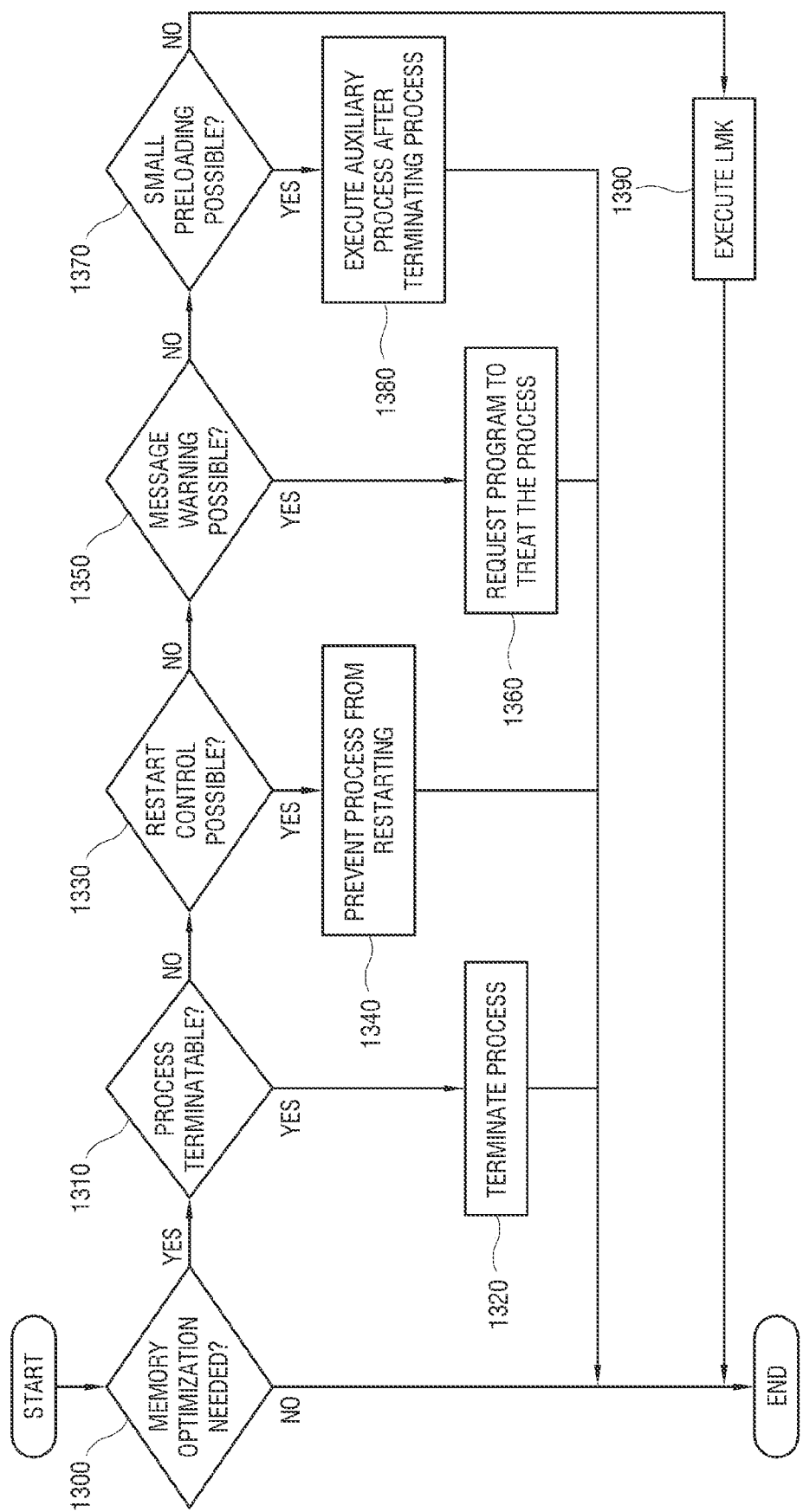

ELECTRONIC APPARATUS AND CONTROL METHOD THEREOF

CROSS-REFERENCE TO RELATED APPLICATION

This application is a Continuation of U.S. application Ser. No. 16/998,284, filed Aug. 20, 2020, which claims priority to KR 10-2019-0102743, filed on Aug. 22, 2019, the entire contents of which are all hereby incorporated herein by reference in their entireties.

BACKGROUND

Field

The disclosure relates to an electronic apparatus in which various pieces of data are loaded to a memory and processed by a central processing unit (CPU) or a processor, and a control method thereof, and for example to an electronic apparatus which operates to secure an available capacity of a memory when the available capacity of the memory is insufficient due to running processes, and a control method thereof.

Description of Related Art

To compute and process predetermined information in accordance with certain processes, an electronic apparatus may include a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied by a display apparatus that displays an image based on processed image data on its own display panel.

Most of electronic apparatuses include a nonvolatile storage medium (or a storage) in which various applications are stored, and a volatile storage medium (or a memory) into which an application to be executed is loaded from the storage. As a representative example of the memory, there is a random-access memory (RAM).

The capacity of the memory provided in the electronic apparatus has become higher as the functions of the electronic apparatus increase, applications need more memory, and multitasking is supported to allow a plurality of applications to run simultaneously. However, a hardware method of physically increasing the capacity of the memory unavoidably and directly leads to cost increase. Therefore, a software method of efficiently using the memory, such as a technique of optimizing the memory or a technique of saving the memory, has been proposed for the electronic apparatus. As a proposed method or technique, there are a memory release policy in a programming language level, a memory saving technique in an operating system level, a memory saving technique in a platform level, etc.

Among the currently proposed techniques of saving the memory, there is a method of securing a memory by forcibly terminating a process, in which the process to be terminated is selected based on priorities of currently running processes. However, there may be a process, of which importance is high under a specific situation, among many processes, and the situations may be different in the process of high importance. However, the priority typically provided to terminate the process tends to be given without considering the importance according to such situations, and thus the situations are not taken into account. Therefore, an important process may be terminated under a specific situation, or a process, which is actually unnecessary even though its priority is high under a specific situation, may not be terminated and it is difficult to secure the memory.

Further, there is a process, which has a redo option or a restart option, among the processes. When the redo option is present in a code of a terminated process, a framework or operating system for managing the processes executes the terminated process again. Such a redo option is applied to the process in order to cope with an operation when the operation requiring the process occurs. However, more and more processes have the redo option, and therefore the terminated processes are highly likely to be executed again even though the processes are terminated to free up an available memory. In this case, the available capacity of the memory is not substantially secured because the terminated processes are executed again. On the contrary, overhead is caused because the re-execution increases the system load of the electronic apparatus.

In this regard, a new memory saving technique, in which the foregoing problems are considered, needs to be applied to the electronic apparatus.

SUMMARY

According to an example embodiment of the disclosure, an electronic apparatus is provided, the electronic apparatus including: a memory; a storage; and a processor, wherein the electronic apparatus is configured to execute a plurality of processes as data of the plurality of processes is loaded into the memory based on execution of at least one program stored in the storage, the processor is configured to: identify a function currently running among a plurality of functions providable by the electronic apparatus, and based on a relationship between the plurality of processes and the identified function, terminate at least one process among the plurality of running processes, and allow a storage area of the memory loaded with the data of the terminated process to be available for another process.

The processor may be configured to allow the storage area of the memory to be available for another process by releasing a mapping state between the terminated process and the storage area of the memory.

The processor may be configured to identify a relationship between the plurality of processes and the identified function based on information about which function among the plurality of functions needs the processes among the plurality of processes.

Based on the terminated process having a restart option for loading the terminated process again into the memory, the processor may be configured to inhibit the terminated process from restarting while the identified function is running.

Based on identification of switching over from a currently running function among the plurality of functions to a second function, the processor may be configured to allow restarting of the terminated process having the restart option.

The processor may be configured to control execution of a partial process partially corresponding to the data of the terminated process.

The partial process may be prepared for preloading of a relevant process, and control the relevant process to be executed based on occurrence of a predetermined event.

The processor may be configured to identify whether to execute the partial process based on information about whether each process is replaceable with the partial process according to the functions.

The processor may be configured to terminate the process by requesting the program of the process to terminate the program.

The processor may identify whether each process requests the program to be terminated based on information about whether each process requests the program to be terminated in each function.

According to another example embodiment of the disclosure, a method of controlling an electronic apparatus is provided, the method including: executing a plurality of processes as data of the plurality of processes is loaded into a memory based on execution of at least one program stored in a storage; identifying a function currently running among a plurality of functions providable by the electronic apparatus; and terminating at least one process among the plurality of running processes based on a relationship between the plurality of processes and the identified function, and allowing a storage area of the memory loaded with the data of the terminated process to be available for another process.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a process map illustrating example setting values for restart control according to various embodiments;

FIG. 13 is a flowchart illustrating an example method in which an electronic apparatus performs memory optimization operations according to various embodiments.

DETAILED DESCRIPTION

Below, various example embodiments will be described in greater detail with reference to accompanying drawings. Further, the example embodiments described with reference to the accompanying drawings are not exclusive to each other unless otherwise mentioned, and a plurality of embodiments may be selectively combined within one apparatus. The combination of these plural embodiments may be discretionally selected and applied by one of ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
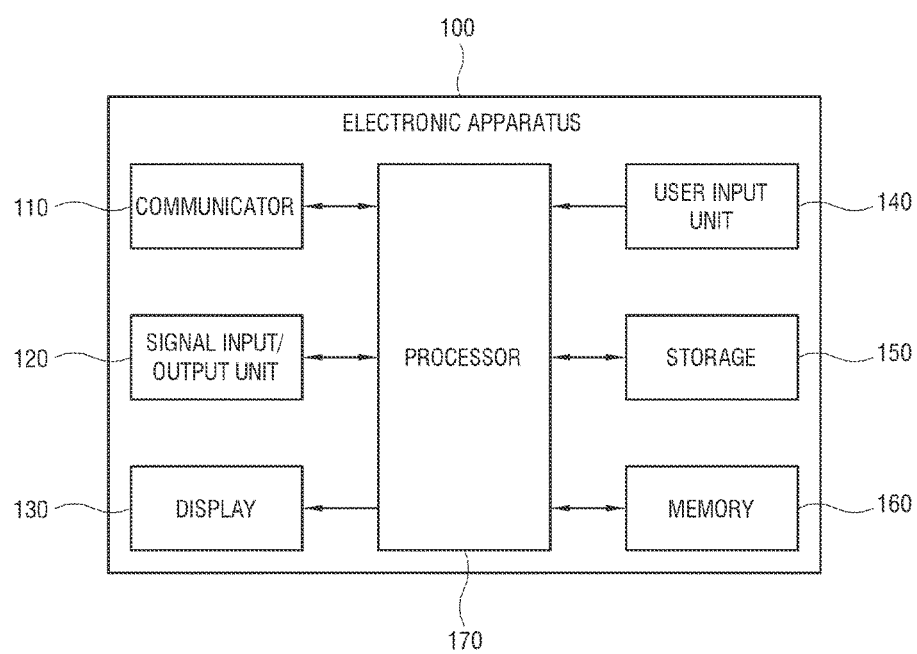
FIG. 1 is a block diagram illustrating an example electronic apparatus according to various embodiments.

FIG. 1 is a block diagram illustrating an example electronic apparatus according to various embodiments.

As shown in FIG. 1, the electronic apparatus 100 according to an embodiment may include a display apparatus capable of displaying an image. When the electronic apparatus 100 includes the display apparatus, the electronic apparatus 100 may include, for example, and without limitation, a television (TV), a computer, a tablet computer, a portable media player, a wearable device, a video wall, an electronic frame, other mobile devices, etc. However, actually, the electronic apparatus 100 may be embodied by not only the display apparatus but also various kinds of apparatuses such as an image processing apparatus, home appliances, an information processing apparatus, etc.

The electronic apparatus 100 includes a communicator (e.g., including communication circuitry) 110, a signal input/output unit (e.g., including input/output circuitry) 120, a display 130, a user input unit (e.g., including user input circuitry) 140, a storage 150, a memory 160, and a processor (e.g., including processing circuitry) 170. Below, the configuration of the electronic apparatus 100 will be described. In this embodiment, it will be described that the electronic apparatus 100 is a display apparatus. However, the electronic apparatus 100 may be embodied by various kinds of apparatuses, and therefore the configuration of the electronic apparatus 100 is not limited to this embodiment. The electronic apparatus 100 may not be embodied by the display apparatus, and the electronic apparatus 100 in this case may not include elements for displaying an image like the display 130.

The communicator 110 may include and refer, for example, to an interactive communication circuit that includes at least one of elements, such as a communication module, a communication chip, etc. corresponding to various wired and wireless communication protocols. For example, the communicator 110 may be embodied by a wireless communication module that performs wireless communication with an access point (AP) based on Wi-Fi, or a local area network (LAN) card connected to a router or a gateway by a wire. For example, the communicator 110 communicates with a server or an external apparatus on a network, thereby transmitting and receiving a data packet.

The signal input/output unit 120 may include and refer, for example, to an input/output circuit that is one-to-one or one-to-many connected to an external apparatus such as a set-top box or an optical media player by a cable, thereby receiving or outputting data from and to the corresponding external apparatus. The signal input/output unit 120 may for example include a high definition multimedia interface (HDMI) port, a display port, a universal serial bus (USB) port, and the like connectors or ports according to preset transmission standards.

The display 130 may include, for example, a display panel capable of displaying an image on a screen. The display panel is provided to have a light receiving structure such as, for example, and without limitation, a liquid crystal type, or a self-emissive structure such as, for example, and without limitation, an organic light emitting diode (OLED) type. The display 130 may include an additional element according to the structures of the display panel. For example, when the display panel is the liquid crystal type, a backlight unit configured to emit light to a liquid crystal display panel, a panel driving substrate configured to drive liquid crystal of the liquid crystal display panel, etc. are added.

The user input unit 140 includes circuitry related to various input interfaces provided to receive a user input. The user input unit 140 may be variously configured according to the kinds of electronic apparatus 100, and may for example include a mechanical or electronic button of the electronic apparatus 100, a remote controller separated from the electronic apparatus 100, a touch pad, a touch screen installed in the display 130, etc.

The storage 150 may include a nonvolatile storage component in which data is stored regardless of whether power is supplied or not. The storage 150 may for example include a flash memory, a hard disk drive, a solid-state drive, etc. The storage 150 is configured to store an operating system for driving the electronic apparatus 100, various applications to be executed on the operating system to perform required functions, and various pieces of software such as middleware, a framework, etc. executed in a layer between the operating system and the application to assist and manage running of the application.

The memory 160 may include a volatile storage component in which data is stored while power is supplied, but data is lost while power is not supplied. The memory 160 may for example include a buffer, a random-access memory, etc. The memory 160 is loaded with data or software to be executed by the processor 170 among the pieces of the data or software stored in the storage 150.

The processor 170 may include various processing circuitry, including, for example and without limitation, one or more hardware processors achieved by a central processing unit (CPU), a dedicated processor, a chipset, a buffer, a circuit, etc. which are mounted on a printed circuit board (PCB). The processor 170 may be designed as a system on chip (SoC). The processor 170 may include modules corresponding to various processes, such as a demultiplexer, a decoder, a scaler, an audio digital signal processor (DSP), an amplifier, etc. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 170 may include main hardware for carrying out general operations of the electronic apparatus 100. From a software point of view, a predetermined operation of the electronic apparatus 100 may be performed by an operating system or a kernel or may be performed by a framework or application to be executed on the kernel, and the processor 170 performs calculation, process and control for data to execute the software. For example, the processor 170 executes the operating system or the kernel of the electronic apparatus 100, and also executes the application on the kernel, thereby performing various processes.

The processor 170 loads data about a process into the memory 160, e.g., the RAM, and executes the process based on the data loaded into the RAM. In this embodiment, the process may refer, for example, to a job unit executed based on the data or application loaded into the memory 160. In other words, the processor 170 processes one or more processes by processing the data loaded into the memory 160 or executing the application loaded into the memory 160. In other words, the data corresponding to the process needs to be loaded into the memory 160 in order to execute the process. Multitasking is carried out as the processor 170 executes pieces of data corresponding to a plurality of processes and loaded into the memory 160 in a state that the pieces of the data corresponding to the processes are being loaded into the memory 160.

While a certain process is being executed with data corresponding to the certain process and loaded into a predetermined stage area of the memory 160, other processes are prevented, e.g., inhibited, from accessing the corresponding storage area of the memory 160 and updating the data. When data corresponding to a first process is loaded to a first storage area of the memory 160, the first storage area is mapped or linked to the first process. The mapping or link between the first process and the first storage area of the memory 160 is maintained while the first process is running. In the state that the first process is mapped to the first storage area, a second process except the first process is prevented from using the first storage area and writing or updating the data in the first storage area.

When the first process is terminated, such a mapping state is released, which can be also said that the first storage area is unmapped or unlinked from the first process. While the first storage area is being unmapped from any process, the second process is allowed to use the first storage area.

However, when many processes are running with such data loaded into the memory 160, an event for securing the available capacity of the memory 160 may occur at a predetermined point in time. Such an event may for example occur in response to a user input or when the available capacity of the memory 160 is lower than or equal to a threshold.

The electronic apparatus 100 may operate as follows in response to the occurrence of the event.

Figure 2:
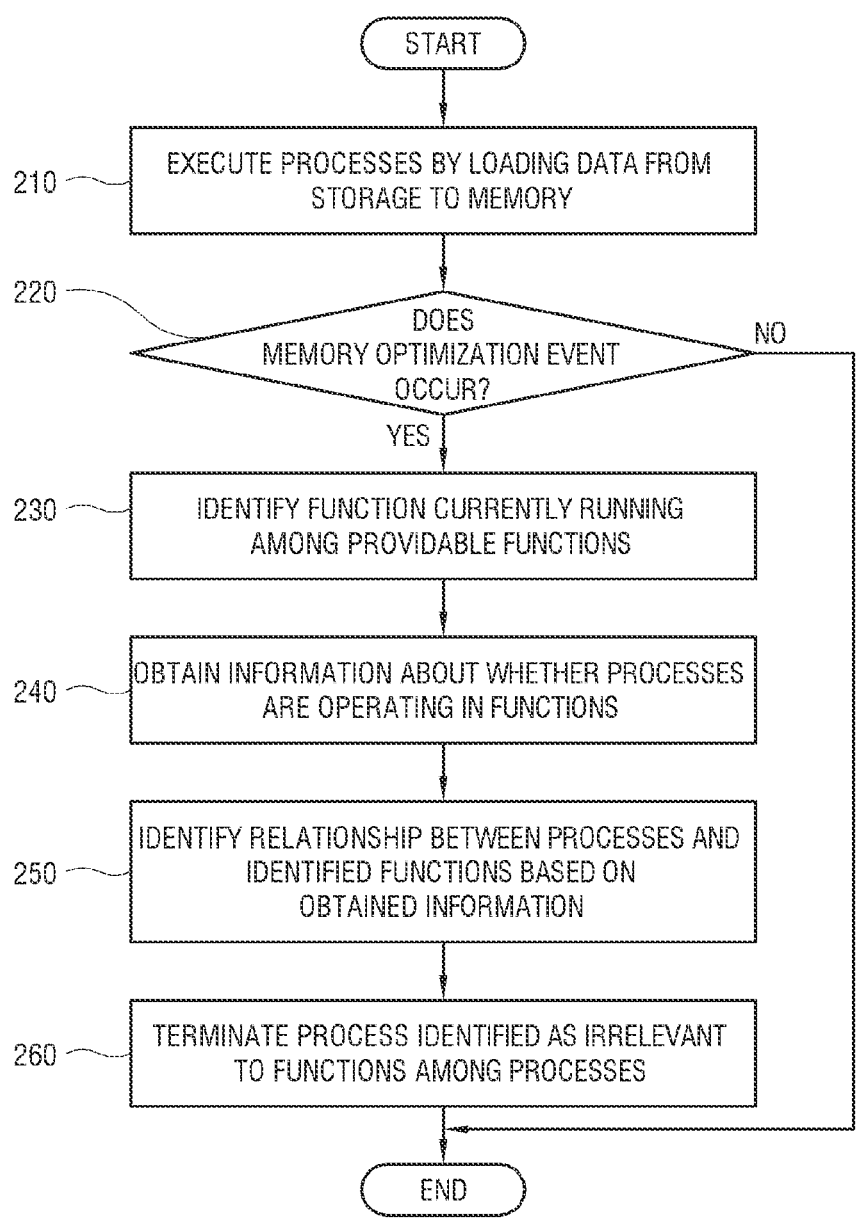
FIG. 2 is a flowchart illustrating an example method of controlling an electronic apparatus according to various embodiments.

FIG. 2 is a flowchart illustrating an example method of controlling an electronic apparatus according to various embodiments.

As shown in FIG. 2, the operations may be performed by the processor of the electronic apparatus. From a software point of view, the following operations may be performed by the operating system of the electronic apparatus or by the middleware or framework on the operating system.

At operation 210 the electronic apparatus loads data from the storage to the memory, and executes a plurality of processes.

At operation 220 the electronic apparatus identifies whether a memory optimization event occurs. When the memory optimization event does not occur ("No" in operation 220), the electronic apparatus performs no additional operations.

When it is identified that the memory optimization event occurs ("Yes" at operation 220), at operation 230 the electronic apparatus identifies a function currently running among a plurality of providable functions.

At operation 240 the electronic apparatus obtains information indicating whether the plurality of processes are operating in the functions. This information may be stored in the electronic apparatus or may be received from a server or the like external apparatus by the electronic apparatus.

At operation 250 the electronic apparatus identifies a relationship between the plurality of processes and the identified functions based on the obtained information.

At operation 260 the electronic apparatus terminates a process identified as irrelevant to the functions among the plurality of processes. In this case, the area of the memory, in which the data of the corresponding process is written, becomes unmapped, and is therefore available for data of other processes in the future. Further, the electronic apparatus maintains the processes identified as relevant to the functions among the plurality of processes.

In this manner electronic apparatus selects the process to free up the memory according to the identified functions, thereby maintaining the processes, which are needed for coping with various situations of the electronic apparatus, in the memory. Thus, the electronic apparatus can efficiently secure the available capacity of the memory.

Below, the memory optimization method will be described in greater detail.

Figure 3:
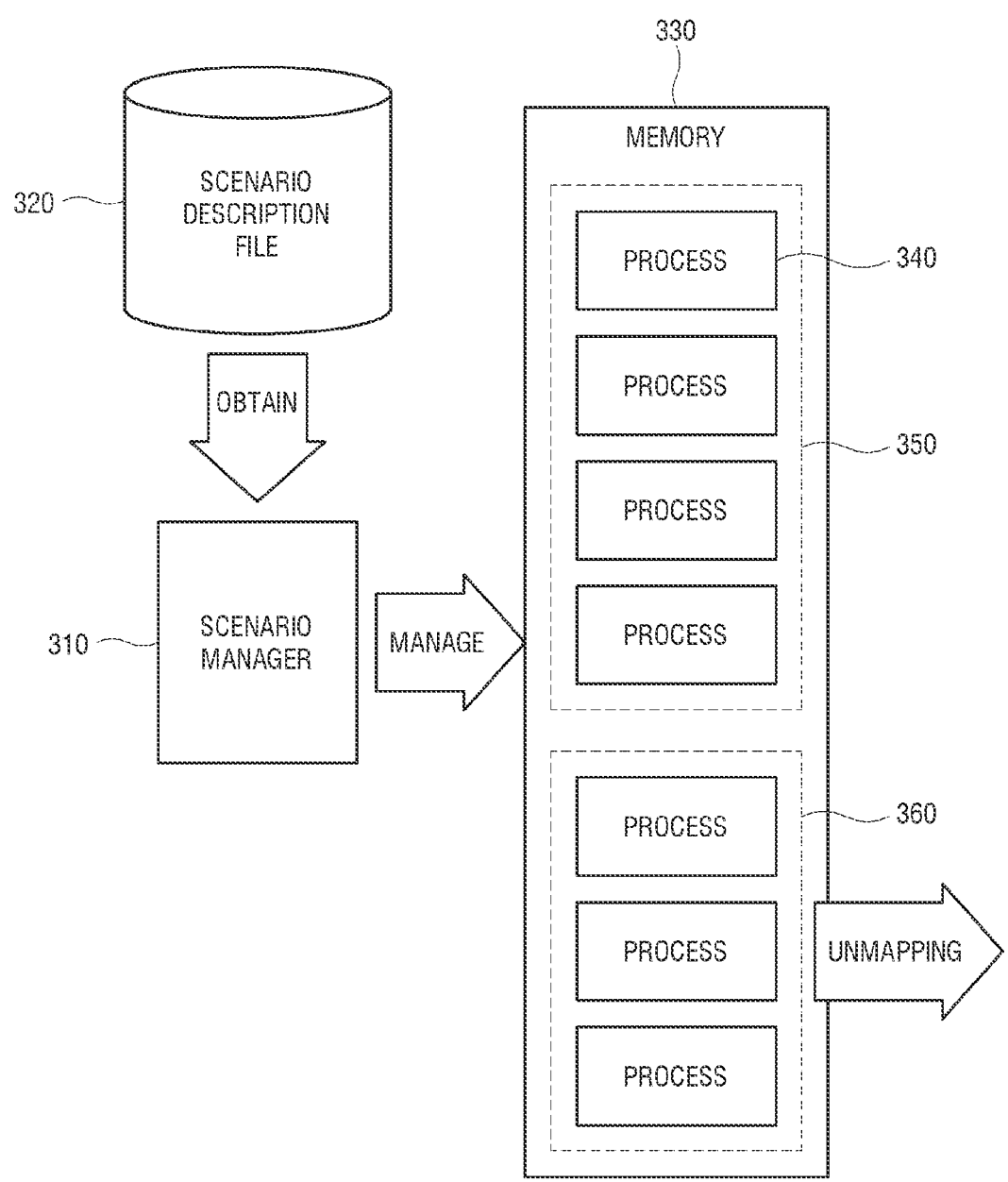
FIG. 3 is a diagram illustrating an example routine of a memory optimization method in an electronic apparatus according to various embodiments.

FIG. 3 is a diagram illustrating an example routine of a memory optimization method in an electronic apparatus according to various embodiments.

As shown in FIG. 3, the procedures of the memory optimization are performed or controlled by a scenario manager 310. The scenario manager 310 may be included in the framework operating on the operating system, or may be a part of the operating system. While the electronic apparatus is operating, the framework for carrying out various functions on the operating system is present in a layer between an operating system level and a user level, and the scenario manager 310 may be embodied by a component for performing operations about the memory optimization within such a framework.

In this embodiment, a scenario may refer, for example, to a situation in which one function is being performed among a plurality of functions providable by the electronic apparatus. In other words, a specific scenario may indicate a state in which a function corresponding to the scenario is being performed in the electronic apparatus.

A scenario description file 320 may include a process map in which relationships between each scenario and a plurality of processes 340 are recorded. The process map indicates whether each process 340 to be executable is relevant to each of the plurality of scenarios. For example, when there are eight scenarios corresponding to eight functions, one processor 340 has eight values, which indicate whether the relationship is present or absent (relevant or irrelevant) according to eight scenarios, in the process map. Details and examples of the process map will be described later.

The scenario manager 310 monitors a situation that the data of the process 340 is loaded into the memory 330 and the process 340 is executed, and a situation that the process 340 is terminated and the area of the memory 330 storing the data is unmapped. The scenario manager 310 selects one scenario among the plurality of scenario based on a predetermined criterion, when the memory optimization event is detected. There are many criteria for selecting the scenario. For example, the scenario manager 310 may select a scenario corresponding to a function identified as currently activated in the electronic apparatus. Alternatively, the scenario manager 310 may select a scenario corresponding to a function to be executed as instructed by a user.

The scenario manager 310 reads the process map obtained from the scenario description file 320. The scenario manager 310 identifies whether the plurality of processes 340 currently loaded to the memory 330 is relevant to the currently selected scenario, based on a definition in the process map. There are no limits to a point in time when the scenario manager 310 obtains the process map from the scenario description file 320. For example, when the electronic apparatus is booted, the scenario manager 310 reads and analyzes the scenario description file 320 and creates a process map based on a result of the analysis.

As a result of identifying the relationship between the plurality of processes 340 and the currently selected scenario, the plurality of processes 340 loaded to the memory 330 may be sorted into a first group 350 relevant to the selected scenario and a second group 360 irrelevant to the selected scenario. The scenario manager 310 allows the process 340 of the first group 350 to run as it is, and keeps the state of the data being loaded into the memory 330. On the other hand, the scenario manager 310 terminates the process 340 of the second group 360, and unmaps the storage area of the memory 330 storing the data of the process 340 so as to be available for another process.

Based on the criterion defined in the process map, the scenario manager 310 may perform various operations as well as the operation of terminating the process 340 of the second group 360. The process map may be designed to record a definition of various operations, and examples in this regard will be described in greater detail below.

In other words, the process map indicates the relationships of the plurality of processes 340 according to the scenarios, e.g., indicates which scenario among the plurality of scenarios is needed for each of the plurality of processes 340. The scenario manager 310 establishes and implements policy of keeping and terminating the processes 340 corresponding to the currently identified scenario, based on the definition of the process map.

Below, examples of content and a criterion defined in the process map will be described in greater detail.

Figure 4:
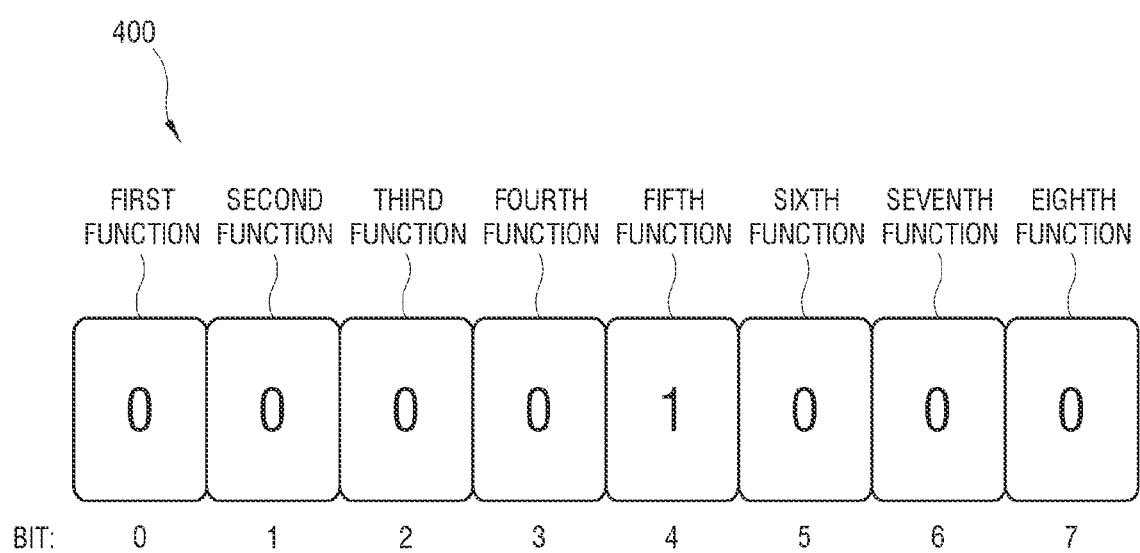
FIG. 4 is a diagram illustrating example bitmap mapping for defining items in a process map according to various embodiments.

FIG. 4 is a diagram illustrating an example bitmap mapping for defining items in a process map according to various embodiments.

As shown in FIG. 4, predetermined items 400 defined according to the processes in the process map have bits as many as the number of scenarios corresponding to the functions provided by the electronic apparatus. The functions provided by the electronic apparatus may, for example and without limitation, include reproduction of a broadcast program, reproduction of a moving picture, browsing of the Internet browsing, play of a game, execution of a program or application for the process, etc. As a predetermined program is executed, one or more processes may be performed. For example, when a program of a moving picture reproducer is executed, a video reproducing process, an audio reproducing process, a subtitle showing process, a video & audio synchronizing process, and the like detailed processes are performed.

One item 400 about one process may include 32 bits in a case of 32 scenarios, and 64 bits in a case of 64 scenarios. One bit has either 0 or 1. In this embodiment, it will be assumed that the item 400 consists of 8 bits to represent 8 scenarios.

For example, the value of each bit of the item 400 represents a relationship with the corresponding function. When the item 400 consists of 8 bits with indexes from 0 to 7, all the bits are respectively assigned with the scenarios of the corresponding functions in such a manner that the $0^{th}$ bit is assigned with a scenario of a first function, the $1^{st}$ bit is assigned with a scenario of a second function, the $2^{nd}$ bit is assigned with a scenario of a third function, the $3^{rd}$ bit is assigned with a scenario of a fourth function, the $4^{th}$ bit is assigned with a scenario of a fifth function, the $5^{th}$ bit is assigned with a scenario of a sixth function, the $6^{th}$ bit is assigned with a scenario of a seventh function, and the $7^{th}$ bit is assigned with a scenario of an eighth function.

When the $0^{th}$ bit has a value of "0", it may refer, for example, to the item 400 being irrelevant to the scenario of the first function corresponding to the 0th bit. On the other hand, when the $4^{th}$ bit has a value of "1", it may refer, for example, to the item 400 being relevant to the scenario of the fifth function corresponding to the $4^{th}$ bit. In this manner of bitmap mapping, the item 400 represents whether the process about the corresponding item 400 is relevant to the scenario of the specific function.

In this embodiment, it is described that only the $4^{th}$ bit has the value of "1". According to the processes, two or more bits may have the value of "1", or all the bits may have the value of either "0" or "1". For example, when the $0^{th}$ and $1^{st}$ bits have the value of "1", it may refer to the item 400 being relevant to both the scenario of the first function corresponding to the 0th bit and the scenario of the second function corresponding to the 1st bit. When all the bits have the value of "0", it may refer, for example, to the item 400 being irrelevant to all the scenarios corresponding to the first to eighth functions.

Such a principle of the bitmap mapping may be applied even when the information represented by the item 400 is not the relationship between the process and the corresponding function but another pieces of information. In this embodiment, each bit represents the relationship between the process and the scenario of the function provided by the electronic apparatus, but the bitmap mapping may be applied to other pieces of information in the process map. An example of applying the bitmap mapping to the process map will be described in greater detail below.

Figure 5:
FIG. 5 is a process map illustrating example setting values for an essential run scenario according to various embodiments.

FIG. 5 is a process map illustrating example setting values for an essential run scenario according to various embodiments.

As shown in FIG. 5, a process map 500 may be configured to define the setting values for the essential run scenario respectively corresponding to a plurality of processes. The essential run scenario refers to information about whether a predetermined process is relevant to a scenario corresponding to each function, e.g., whether a predetermined process operates in each function. For example, when there are scenarios respectively corresponding to eight functions, the essential run scenario corresponding to a certain process has information of 8 bits indicating whether the corresponding process is relevant to the scenarios.

For example, the essential run scenario of the first process in the process map 500 has a setting value of "00001000".

Based on the example of FIG. 4, in the setting values, the $5^{th}$ bit corresponding to the sixth function has the value of "1", and the bits corresponding to the other functions have the values of "0". In other words, the process map 500 shows that the first process is relevant to the sixth function but not relevant to the other functions. Further, the essential run scenario of the third process has the same setting value of "00001000", and this may refer, for example, to the third process being relevant to the sixth function but not relevant to the other functions.

The essential run scenario of the second process has a setting value of "11100000", and may refer, for example, to the second process being relevant to the first, second and third functions but not relevant to the other fourth, fifth, sixth, seventh and eighth functions.

The essential run scenario of the fourth process has a setting value of "11111111", and this may refer, for example, to the fourth process being relevant to all the first to eighth functions.

Below, it will be described that the electronic apparatus identifies the process relevant to the scenario of the identified function based on the process map 500.

Figure 6:
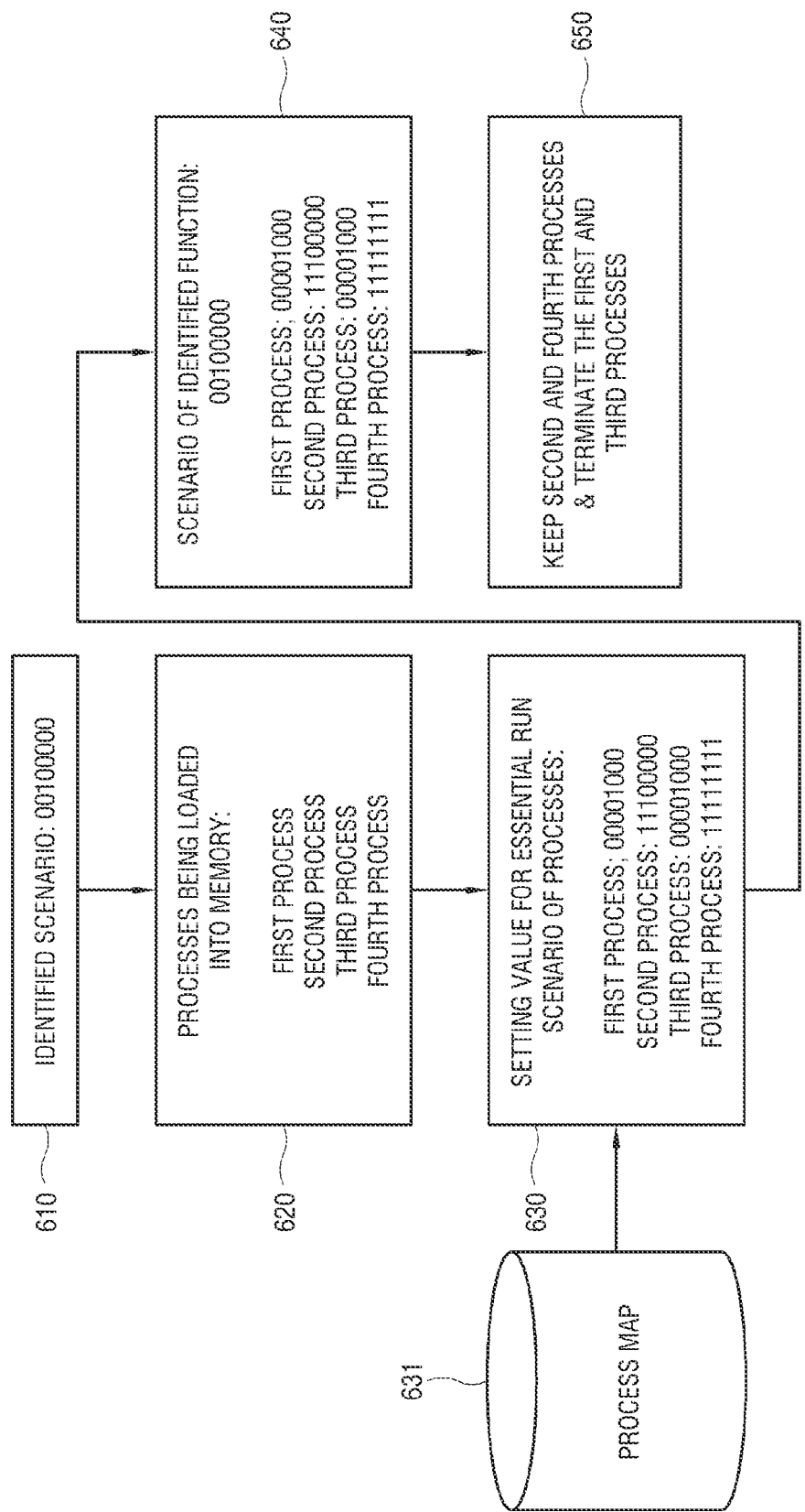
FIG. 6 is a block diagram illustrating an example procedure in which an electronic apparatus identifies a process relevant to a scenario of an identified function based on a process map according to various embodiments.

FIG. 6 is a block diagram illustrating an example procedure in which an electronic apparatus identifies a process relevant to a scenario of an identified function based on a process map according to various embodiments.

As shown in FIG. 6, when the memory optimization event occurs, at operation 610 the electronic apparatus identifies the scenario of the function corresponding to the current point in time, and obtains a state value of the scenario of the identified function. The state value of the scenario of the identified function has a form based upon a setting value of an essential run scenario in a process map 631. For example, when the electronic apparatus identifies the third function as the function corresponding to the current point in time, the state value of "00100000" is identified.

At operation 620, the electronic apparatus identifies the currently running or activated processes. In the activated processes, their data is being loaded to the memory, and the storage areas of the memory loaded with the data are being mapped to the corresponding processes. The data of the inactivated process is not being loaded to the memory, or there are no storage areas of the memory mapped to the corresponding processes (in other words, an unmapped state). In this embodiment, it will be for example assumed that a first process, a second process, a third process, and a fourth process are activated and their data is being loaded to the memory.

At operation 630 the electronic apparatus obtains the setting value for the essential run scenario of each process from the process map 631. For example, the setting value for the essential run scenario may be "00001000" in a case of the first process, "11100000" in a case of the second process, "00001000" in a case of the third process, and "11111111" in a case of the fourth process.

At operation 640, the electronic apparatus distinguishes between the processes relevant to the identified function and the processes irrelevant to the identified function, based on the state values of the scenario of the identified function and the setting values for the essential run scenario from the process map 631.

For example, the electronic apparatus compares the state value of the scenario of the identified function with the setting value for the essential run scenario of each process. The electronic apparatus identifies that the process, of which the bits of the same index have the value of "1" in common with each other between the state value of the scenario of the identified function and the setting value for the essential run scenario of each process, is relevant to the scenario of the identified function. On the other hand, the electronic apparatus identifies that the process, of which the bits of the same index does not have the value of "1" in common with each other between the state value of the scenario of the identified function and the setting value for the essential run scenario of each process, is irrelevant to the scenario of the identified function.

For example, only the $3^{rd}$ bit in the state value of "00100000" corresponding to the scenario of the identified function has the value of "1". Among the first to fourth processes, the $3^{rd}$ bits of the second process and the fourth process have the value of "1", but the $3^{rd}$ bits of the first process and the third process have the value of "0". Thus, the electronic apparatus identifies that the second process and the fourth process are relevant to the scenario of the identified function, but the first process and the third process are irrelevant to the scenario of the identified function.

At operation 650 the electronic apparatus keeps the second process and the fourth process as they are in the memory, but terminates the first process and the third process. As the first process and the third process are terminated, the storage areas of the memory loaded with the data of the corresponding processes become unmapped.

When the memory optimization event occurs, the electronic apparatus keeps the process relevant to the current scenario of the identified function but terminates the process irrelevant to the current scenario of the identified function. The electronic apparatus terminates the process that does not correspond to the currently identified function, thereby selecting the process according to situations in terms of selecting the process to be terminated for optimizing the memory.

The foregoing embodiment illustrates that the process map is used to identify the process irrelevant to the scenario of the identified function. However, there are no limits to the definition and use method of the process map, and another embodiment of the definition and use method of the process map will be described below.

FIG. 7 is a process map illustrating example setting values for restart control according to various embodiments.

As shown in FIG. 7, a process map 700 is configured to define the setting values for the restart control respectively corresponding to a plurality of processes. A restart control item refers to information about whether a process is preventable from being executed again during a progress of a scenario after the process is terminated, in a case where the process is identified as needed to be terminated under the scenario of the identified function. In other words, the item of the restart control refers to information about whether the redo option (or restart option) of the corresponding process is delayable during the scenario. The process map 700 may further include the restart control item in addition to the essential run scenario item.

In terms of performing a process in a program, the redo option may be assigned to a specific process. The redo option may be recorded in a data code of the process. There are various reasons for assigning the redo option to a certain process. For example, the redo option may be given to a predetermined process so that the process can continuously reside in the background, when the process is frequently linked to another process by a program policy.

Setting values for the restart control according to the processes include a plurality of bits respectively corresponding to a plurality of functions, and each bit indicates whether restarting is preventable under the corresponding function.

For example, when the restart control setting values of each process include 8 bits, the value of each bit indicates whether the redo option is enabled under scenarios according to eight functions. Here, when each bit of the restart control setting values has a value of either "0" or "1", it may refer, for example, to the redo option being assigned to the corresponding process. In this process map 700, the first process, the second process and the third process have the redo option.

On the other hand, when the restart control setting values have a null value, it may refer, for example, to the corresponding process not having the redo option. According to this process map 700, the restart control setting value of the fourth process has the null value, and may refer, for example, to the redo option not being assigned to the fourth process. In other words, when the fourth process is terminated under the scenario of the identified function, the fourth process is not executed again while the corresponding scenario continues.

When the first process has a restart control setting value of "00000000", it may refer, for example, to the restarting of the first process cannot be blocked, prevented or delayed under all the scenarios of first to eighth functions. In other words, the first process is executed again by the redo option even though it is terminated. When the first process is an important process in operations of the electronic apparatus, the restarting of the first process may be allowed based on the definition of the process map 700. It is the same for the third process.

When the second process has a restart control setting value of "00000111", it may refer, for example, to the restarting of the second process cannot be blocked, prevented or delayed under the scenarios of the first, second, third, fourth and fifth functions. In other words, under the scenarios of the first to fifth functions, the second process is executed again by the redo option even though its data is removed from the memory. On the other hand, the restarting of the second process is blocked, prevented or delayed under the scenarios of the sixth, seventh and eighth functions. In other words, the electronic apparatus blocks, prevents and delays the restarting of the second process after terminating the second process, while the scenarios of the sixth to eighth functions are in progress. When the ongoing scenario is changed according to the functions, the electronic apparatus resets the blocked restarting of the second process, and performs an operation corresponding to the changed scenario of the function.

Below, it will be described that the electronic apparatus identifies a process irrelevant to the scenario of the identified function and identifies whether to prevent/inhibit the identified process from being executed again based on the process map 700.

Figure 8:
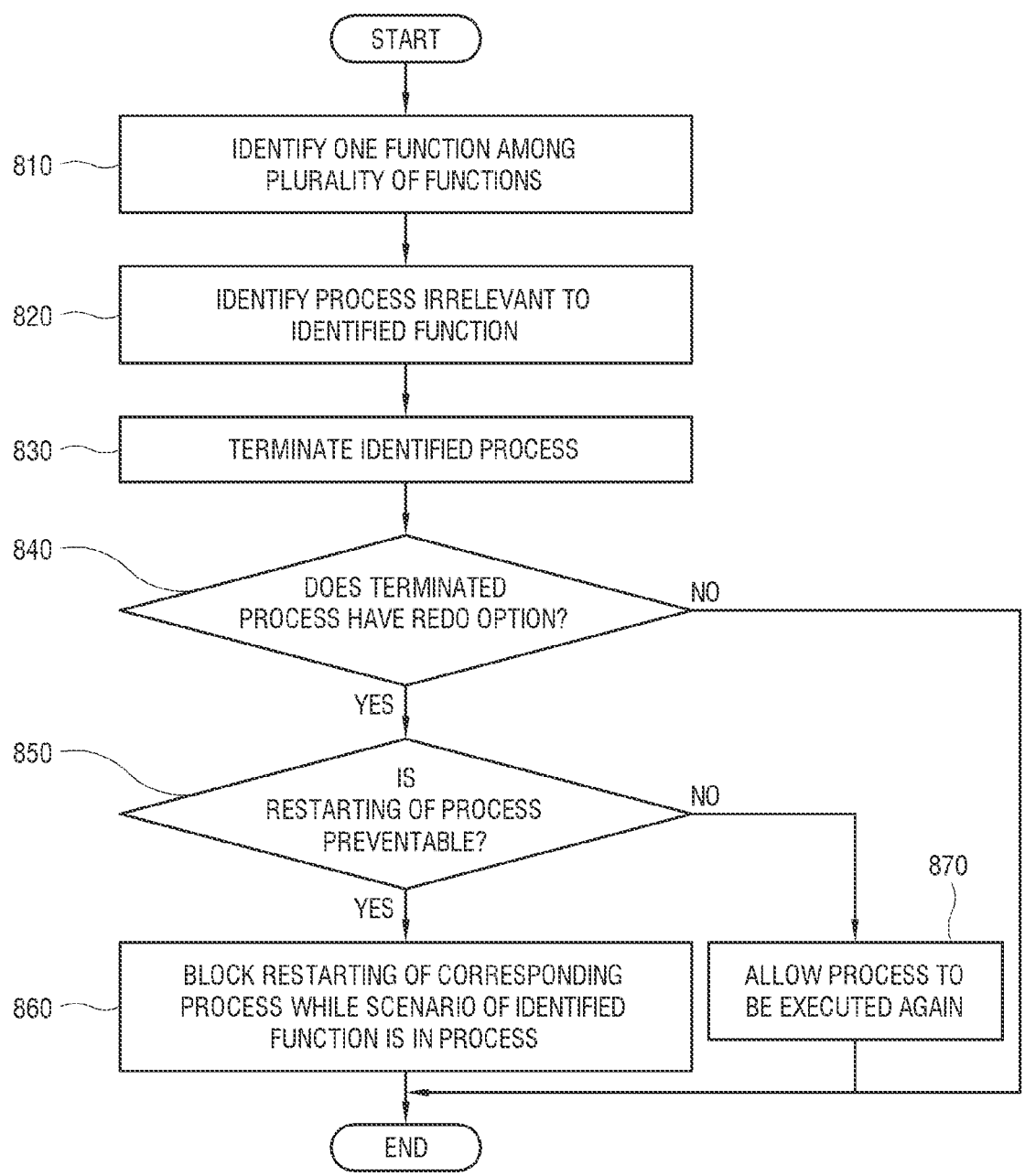
FIG. 8 is a flowchart illustrating an example method in which an electronic apparatus selectively inhibits processes to be terminated from being executed again in response to a memory optimization event according to various embodiments.

FIG. 8 is a flowchart illustrating an example method in which an electronic apparatus selectively prevents/inhibits processes to be terminated from being executed again in response to a memory optimization event according to various embodiments.

As shown in FIG. 8, the following operations may be performed by the processor of the electronic apparatus. From a software point of view, the following operations may be performed by the operating system of the electronic apparatus or by the middleware or framework on the operating system.

At operation 810 the electronic apparatus identifies one function among a plurality of functions in response to the memory optimization event.

At operation 820 the electronic apparatus identifies one or more processes irrelevant to the identified function among the plurality of processes of which data is being loaded to the memory. A method of identifying the process is the same as described in the foregoing embodiments.

At operation 830 the electronic apparatus terminates the identified process. Thus, the electronic apparatus performs memory optimization.

At operation 840 the electronic apparatus identifies whether the identified process, e.g., the terminated process has the redo option. When the identified process does not have the redo option, the electronic apparatus does not perform any additional operation with regard to the terminated process.

When it is identified that the terminated process has the redo option ("Yes" at operation 840), at operation 850 the electronic apparatus identifies whether the restarting of the corresponding process is preventable.

When it is identified that the restarting of the corresponding process is preventable ("Yes" at operation 850), at operation 860 the electronic apparatus blocks the restarting of the corresponding process so that the corresponding process cannot be executed again while the scenario of the identified function is in process.

On the other hand, it is identified that the restarting of the corresponding process is not preventable ("No" at operation 850), at operation 870 the electronic apparatus allows the process to be executed again without any additional operation.

The electronic apparatus identifies whether there is a process of which restarting is blocked in a scenario of a first function, in response to an event of switching over from the scenario of the identified first function to a scenario of a second function. When there is the process of which restarting is prevented, the electronic apparatus allows the corresponding process to be executed again under the scenario of the second function.

From a software point of view, the memory optimization operation is controlled by the scenario manager of the framework, but the restarting of the process is performed by the program or operating system relevant to the corresponding process. According to the attributes of the process or the attributes of the redo option assigned to the process, the scenario manager can prevent the restarting of the process or cannot prevent the restarting of the process. In this embodiment, the electronic apparatus prevents the process from being executed again with regard to at least the process of which the restarting is preventable, thereby more efficiently performing the memory optimization.

For the memory optimization, there may be various methods of processing the process identified as irrelevant to the current scenario. For example, when one or more processes are identified as irrelevant to the current scenario, the electronic apparatus may terminate the identified processes as described in the foregoing embodiments. Further, the electronic apparatus may perform small preloading or message warning with regard to the identified processes instead of terminating the identified processes. Below, the small preloading will be described.

Figure 9:
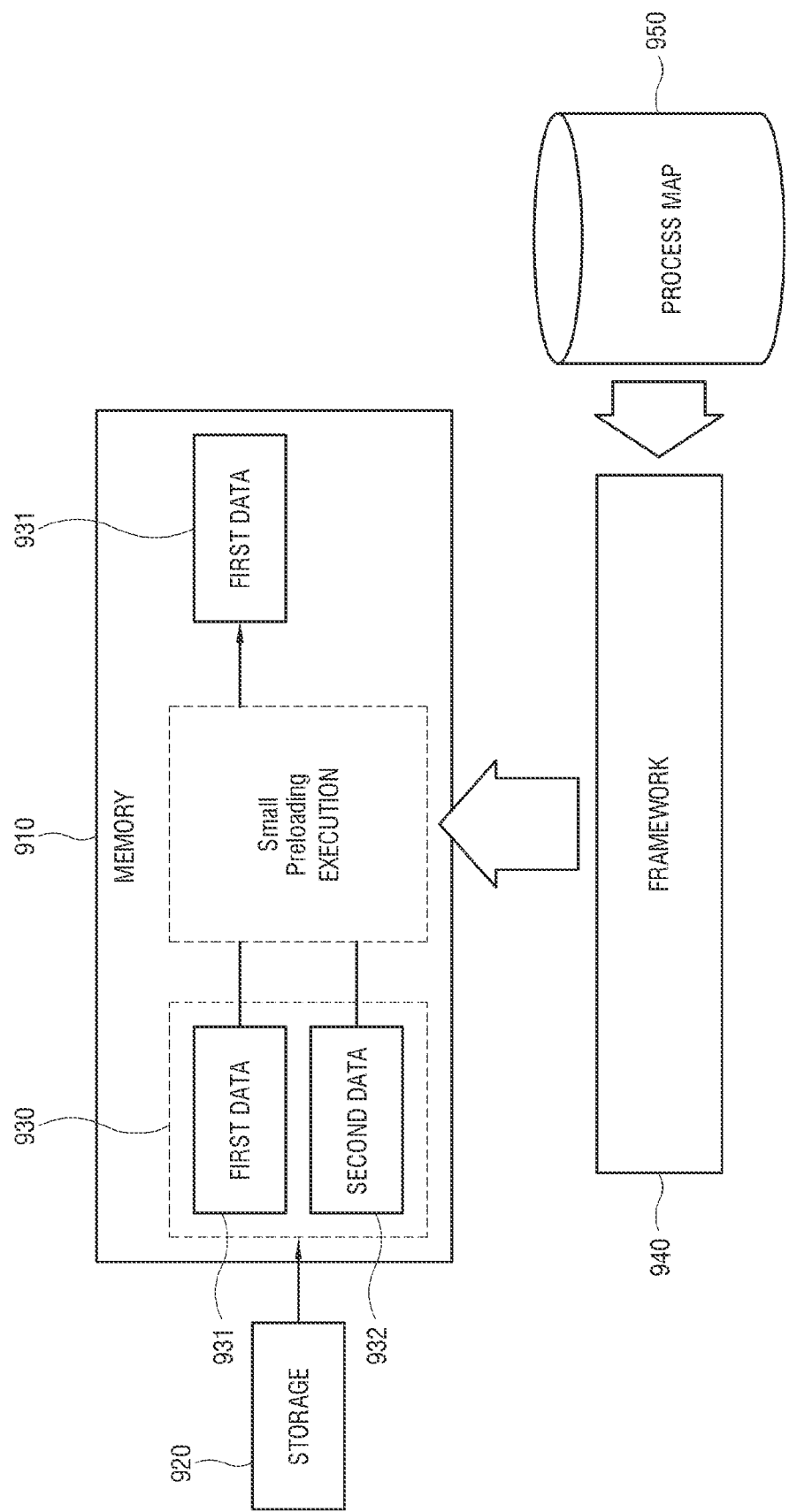
FIG. 9 is a block diagram illustrating an example principle of small preloading performed in an electronic apparatus according to various embodiments.

FIG. 9 is a block diagram illustrating an example of small preloading performed in an electronic apparatus according to various embodiments.

As shown in FIG. 9, a storage 920 is configured to store the whole data 930 of a predetermined process. The whole data 930 of the process is loaded from the storage 920 into a memory 910, and the whole data 930 loaded into the memory 910 is processed to thereby execute the process.

The whole data 930 may refer, for example, to the whole of the data corresponding to one process.

According to this embodiment, the whole data 930 of the process includes first data 931 corresponding to a partial process, and second data 932 corresponding to the rest of the whole data 930 except the first data 931. The partial process may be a part of the process, and may be a sub process for receiving an event relevant to the process and triggering the complete function of the process, when the process is not activated (e.g., when the function of the process is not completely running, or the whole data 930 of the process is not fully loaded into the memory 910). In other words, the partial process refers to data for preloading the process relevant to the partial process, and is provided to control the data of the process to be fully loaded into the memory when a predetermined event occurs.

While the whole data 930 of the process is being loaded into the memory 910, the corresponding process may be identified as needed to be terminated. In this case, a framework 940 keeps a mapping state of the storage area loaded with the first data 931 without unmapping the storage area loaded with the whole data 930 in the memory 910, and unmaps the storage area loaded with the second data 932. In other words, the framework 940 inactivates the process and activates the partial process. Such an operation may be referred to as the small preloading.

The small preloading holds the first data 931 in the memory 910 and thus secures the available capacity of the memory 910, which is less than that of when the storage area of the whole data 930 is unmapped by terminating the process. However, the small preloading activates the partial process based on the first data 931, and therefore executes the process based on the partial process when an event relevant to the process occurs.

The framework 940 identifies the process, to which the small preloading is applicable, with reference to a process map 950. Below, an example of the process map 950 will be described in greater detail.

Figure 10:
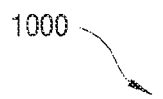
FIG. 10 is a process map illustrating example setting values for small preloading according to various embodiments.

FIG. 10 is an example process map illustrating example setting values for the small preloading according to various embodiments.

As shown in FIG. 10, a process map 1000 is configured to define small preloading setting values respectively corresponding to a plurality of processes. A small preloading item may refer, for example, to information about whether the small preloading of the process is possible under a scenario of an identified function. The process map 1000 may further include the small preloading item in addition to the essential run scenario item.

Small preloading setting values according to the processes include a plurality of bits respectively corresponding to a plurality of functions, and each bit indicates whether the small preloading is possible under the corresponding function. For example, when the small preloading setting value of each process includes 8 bits, the values of the bits indicate whether the small preloading is possible under the scenarios of eight functions. The small preloading is possible when the bit has a value of "1", but impossible when the bit has a value of "0".

When a first process has a small preloading setting value of "00000000", the small preloading is not applicable to the first process under all the scenarios of the first to eight functions. Therefore, the electronic apparatus has to terminate the first process or perform the like operation except the small preloading when the first process is treated for the memory optimization. This is the same for the second process and the fourth process.

When a third process has a small preloading setting value of "11110111", the small preloading is applicable to the third process under the scenarios of all the functions except the fifth function among the first to eighth functions. The framework applies the small preloading to the third process under the scenarios of the functions except the fifth function among the first to eighth functions, thereby securing the available capacity of the memory.

Below, the message warning will be described in greater detail.

Figure 11:
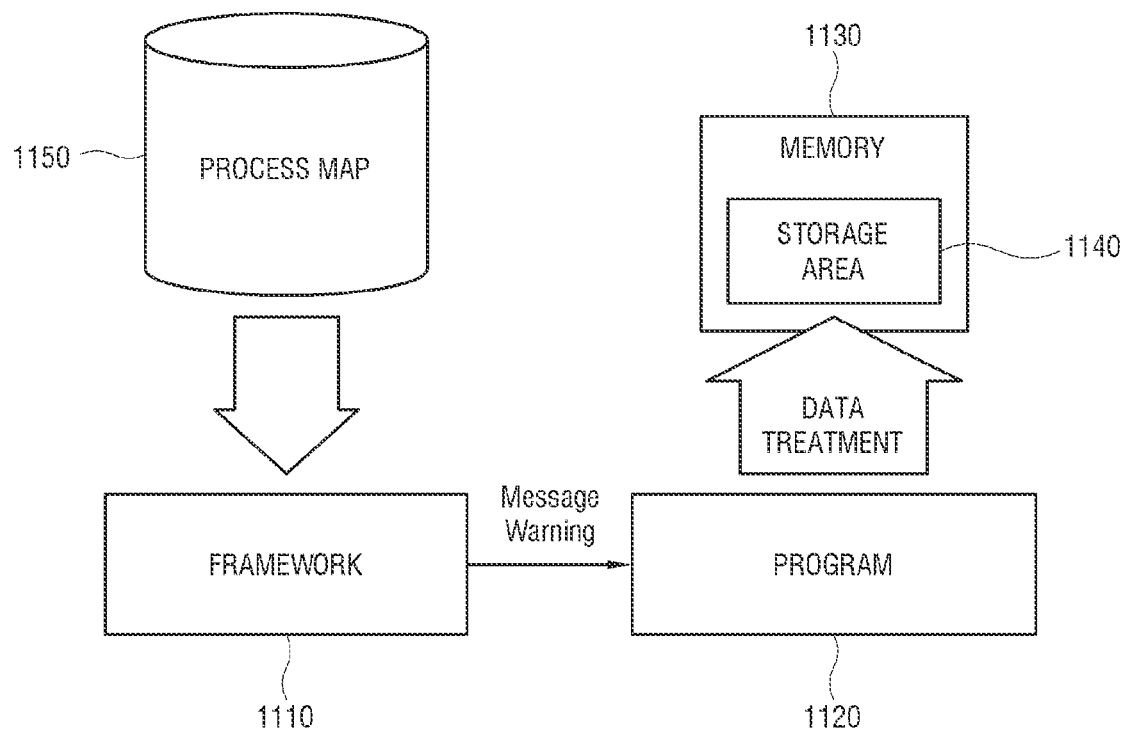
FIG. 11 is a block diagram illustrating an example principle of message warning performed in an electronic apparatus according to various embodiments.

FIG. 11 is a block diagram illustrating an example of message warning performed in an electronic apparatus according to various embodiments.

As shown in FIG. 11, a program 1120 loads data of a process stored in a storage into a memory 1130 and executes the loaded data, thereby performing the corresponding process. A framework 1110 optimizes the memory 1130 to thereby secure the available capacity of the memory 1130. The operations for optimizing the memory 1130 in the framework 1110 are the same as described in the foregoing embodiments.

From a software point of view, the framework 1110 and the program 1120 are different components, and therefore there is a difference between the operation performable by the framework 1110 and the operation performable by the program 1120. Further, the foregoing embodiments show that the framework 1110 terminates the process to directly perform an operation of unmapping a storage area 1140 of the memory 1130 in which the data of the corresponding process is stored, or requests the operating system present in the lower layer of the framework 1110 to perform the corresponding operation. However, it may be impossible for the framework 1110 to directly terminate a specific process by a policy on the process.

In this case, the framework 1110 may perform the message warning with regard to the corresponding process. The message warning refers to an operation of identifying the program 1120 that executes the process and requesting the identified program 1120 to treat the corresponding process. The program 1120 checks the process to which notification of message warning is given from the framework 1110, and terminates the corresponding process. Thus, the storage area 1140 of the memory 1130 loaded with the data becomes unmapped.

The framework 1110 may identify the process to which the message warning is applicable, based on a process map 1150. Below, an example of the process map 1150 will be described.

Figure 12:
FIG. 12 is a process map illustrating example setting values for message warning according to various embodiments.

FIG. 12 is a process map illustrating example setting values for message warning according to various embodiments.

As shown in FIG. 12, a process map 1200 is configured to define the setting values for the message warning respectively corresponding to a plurality of processes. A message warning item may refer, for example, to information about whether message warning for a process is performable under a scenario of an identified function. The process map 1200 may further include the message warning item in addition to the essential run scenario item.

Message warning setting values according to the process include a plurality of bits respectively correspond ding to a plurality of functions, and each bit indicates whether the message warning is possible under the corresponding function. For example, when the message warning setting value of each process includes 8 bits, the values of the bits indicate whether the message warning is possible under the scenarios of eight functions. The message warning is possible when the bit has a value of "1", but impossible when the bit has a value of "0".

When the second process has a message warning setting value of "00000000", the message warning is not applicable to the second process under all the scenarios of the first to eight functions. Therefore, the electronic apparatus has to perform a separately prepared operation except the message warning when the second process is treated for the memory optimization. This is the same for the third process and the fourth process.

When the first process has a message warning setting value of "11101111", the message warning is applicable to the first process under the scenarios of all the functions except the fourth function among the first to eighth functions. The framework applies the message warning to the first process under the scenarios of the functions except the fourth function among the first to eighth functions, thereby securing the available capacity of the memory.

The operation of the foregoing embodiments may be performed independently, or the plurality of operations may be performed in association with each other. Below, it will be described that various methods are selectively performed when the framework performs the memory optimization.

FIG. 13 is a flowchart illustrating an example method in which an electronic apparatus performs memory optimization operations according to various embodiments.

As shown in FIG. 13, the following operations may be performed by the processor of the electronic apparatus. From a software point of view, the following operations may be performed by the operating system of the electronic apparatus or by the middleware or framework on the operating system.

At operation 1300, the electronic apparatus identifies whether memory optimization is needed, in response to an event that a scenario of a predetermined function is changed. The electronic apparatus may identify the memory optimization is needed when the available capacity of the memory is lower than a threshold. When it is identified that the memory optimization is not needed ("No" in operation 1300), the electronic apparatus does not perform any additional operation relevant to the memory optimization.

When it is identified that the memory optimization is needed ("Yes" at operation 1300), at operation 1310 the electronic apparatus identifies whether termination of a predetermined activated process is possible.

When it identified that the termination of the process is possible ("Yes" at operation 1310), at operation 1320 the electronic apparatus terminates the corresponding process. Thus, the storage area of the memory loaded with the memory of the corresponding process becomes unmapped, and the available capacity of the memory increases.

On the other hand, when it identified that the termination of the process is not possible ("No" at operation 1310), at operation 1330 the electronic apparatus identifies whether the restart control for the process is possible.

When it is identified that the restart control for the process is possible ("Yes" at operation 1330), at operation 1340 the electronic apparatus prevents the process from being executed again while the scenario of the identified function is in progress, thereby delaying the restarting of the process.

On the other hand, when it is identified that the restart control for the process is not possible ("No" at operation 1330), at operation 1350 the electronic apparatus identifies whether the message warning for the process is possible.

When it is identified that the message warning for the process is possible ("Yes" at operation 1350), at operation 1360 the electronic apparatus requests a program, which manages or executes the corresponding process, to treat the process.

On the other hand, when it is identified that the message warning for the process is not possible ("No" at operation 1350), at operation 1370 the electronic apparatus identifies whether small preloading for the process is possible.

When it is identified that the small preloading for the process is possible ("Yes" at operation 1370), at operation 1380 the electronic apparatus executes an auxiliary process after terminating the process.

On the other hand, when it is identified that the small preloading for the process is not possible ("No" at operation 1370), at operation 1390 the electronic apparatus executes a low memory killer (LMK). The LMK may refer, for example, to a method of sequentially terminating the processes according to priorities until the available capacity of the memory is secured, under the condition that the priorities are previously assigned to the plurality of processes loaded into the memory. However, the electronic apparatus may employ various memory recovery techniques such as an output-of memory killer (OOM Killer), etc. as well as the LMK.

The electronic apparatus selectively applies various optimization methods to a predetermined process targeted for memory optimization, thereby more efficiently managing the memory.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (or deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension may refer, for example, to technology of recognizing, applying and processing a human's language or text, and includes natural language processing, machine translation, conversation system, question and answer, voice recognition and synthesis, etc.

Inference and prediction may refer, for example, to technology of identifying information and logically making prediction, and includes knowledge- and probability-based inference, optimized prediction, preference-based plan, recommendation, etc.

Knowledge representation may refer, for example, to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic apparatus comprising:
  a memory configured to load data of a plurality of processes and to execute a program; and
  a processor configured to:
    in response to a process to be terminated being selected among the plurality of processes while a first function runs among a plurality of functions provided by the electronic apparatus, identify whether the selected process is designated to restart,
    based on the selected process being designated to restart, identify whether a restarting of the selected process is able to be delayed while the first function is run,
    based on identifying that the restarting of the selected process is able to be delayed, terminate the selected process and prevent restarting the terminated process while the first function is run, and
    in response to a second function running among the plurality of functions, allow to restart the terminated process.

2. The electronic apparatus according to claim 1, wherein the processor is configured to select the process to be terminated, based on a relationship between the first function and the plurality of processes.

3. The electronic apparatus according to claim 2, wherein the processor is configured to identify the relationship based on information about which function among the plurality of functions requires the processes among the plurality of processes.

4. The electronic apparatus according to claim 1, wherein the processor is configured to allow a storage area of the memory loaded with data of the terminated process to be available for another process.

5. The electronic apparatus according to claim 4, wherein the processor is configured to allow the storage area of the memory to be available for another process by releasing a mapping state between the terminated process and the storage area of the memory.

6. The electronic apparatus according to claim 1, wherein the processor is configured to control execution of a partial process partially corresponding to data of the terminated process.

7. The electronic apparatus according to claim 6, wherein the partial process is prepared to preload a relevant process and configured to execute the relevant process in response to occurrence of a predetermined event.

8. The electronic apparatus according to claim 6, wherein the processor is configured to identify whether to execute the partial process based on information about whether each process is replaceable with the partial process based on the functions.

9. The electronic apparatus according to claim 1, wherein the processor is configured to control to terminate the selected process by requesting a program relating to the selected process to terminate the selected process.

10. A control method of an electronic apparatus, the method comprising:
   in response to a process to be terminated being selected among a plurality of processes to execute a program while a first function runs among a plurality of functions provided by the electronic apparatus, identifying whether the selected process is designated to restart;
   based on the selected process being designated to restart, identifying whether a restarting of the selected process is able to be delayed while the first function is run;
   based on identifying that the restarting of the selected process is able to be delayed, terminating the selected process and preventing restarting the terminated process while the first function is run, and
   in response to a second function running among the plurality of functions, allowing to restart the terminated process.

11. The electronic apparatus according to claim 10, wherein the identifying whether the selected process is designated to restart comprises:
   selecting the process to be terminated, based on a relationship between the first function and the plurality of processes.

12. The control method according to claim 11, wherein the selecting the process to be terminated comprises:
   identifying the relationship based on information about which function among the plurality of functions requires the processes among the plurality of processes.

13. The control method according to claim 10, wherein the terminating the selected process comprises:
   allowing a storage area of the memory loaded with data of the terminated process to be available for another process.

14. The control method according to claim 13, wherein the allowing the storage area of the memory comprises:
   allowing the storage area of the memory to be available for another process by releasing a mapping state between the terminated process and the storage area of the memory.

15. The control method according to claim 10, further comprising:
   controlling execution of a partial process partially corresponding to data of the terminated process.

16. The control method according to claim 15, wherein the partial process is prepared to preload a relevant process and configured to execute the relevant process in response to occurrence of a predetermined event.

17. The control method according to claim 15, wherein the controlling execution of the partial process comprises:
   identifying whether to execute the partial process based on information about whether each process is replaceable with the partial process based on the functions.

18. The control method according to claim 10, wherein the terminating the selected process comprises:
   controlling to terminate the selected process by requesting a program relating to the selected process to terminate the selected process.

19. A non-transitory computer-readable medium recording instructions for execution by a processor of an electronic apparatus to cause the electronic apparatus to perform a method, the method comprising:
   in response to a process to be terminated being selected among a plurality of processes to execute a program while a first function runs among a plurality of functions provided by the electronic apparatus, identifying whether the selected process is designated to restart;
   based on the selected process being designated to restart, identifying whether a restarting of the selected process is able to be delayed while the first function is run;
   based on identifying that the restarting of the selected process is able to be delayed, terminating the selected process and preventing restarting the terminated process while the first function is run, and
   in response to a second function running among the plurality of functions, allowing to restart the terminated process.

* * * * *